United States Patent [19]

Spanides

[11] 4,286,623
[45] Sep. 1, 1981

[54] FAUCET CONTROL DEVICE

[76] Inventor: Moschoula Spanides, 82a, Themistokleous St., Piraeus, Greece

[21] Appl. No.: 91,732

[22] Filed: Nov. 6, 1979

[30] Foreign Application Priority Data

| Nov. 10, 1978 | [GR] | Greece | 57630 |
| Dec. 9, 1978 | [GR] | Greece | 57826 |
| May 4, 1979 | [GR] | Greece | 59005 |

[51] Int. Cl.³ .................................................. F16K 19/00
[52] U.S. Cl. ............................. 137/597; 137/467; 137/625.4
[58] Field of Search ........... 137/467, 597, 606, 625.17, 137/625.4

[56] References Cited

U.S. PATENT DOCUMENTS

| 2,918,939 | 12/1959 | Holvenstot | 137/625.4 X |
| 2,996,082 | 8/1961 | Miner | 137/625.4 |
| 3,459,223 | 8/1969 | Katva | 137/625.17 |
| 3,519,020 | 7/1970 | Gentil | 137/625.17 |
| 3,542,066 | 11/1970 | Cordova | 137/597 |
| 3,911,946 | 10/1975 | Humpert | 137/597 X |

*Primary Examiner*—Robert G. Nilson

[57] ABSTRACT

A faucet control device comprising (a) a hollow sleeve member having one outlet and two, axially spaced and opposite each other, inlets capable of being connected with hot and cold water conduits, the latter having separate control handles, and (b) a piston slidable in the sleeve for movement between a first inserted position in which said inlets are blocked and a second retracted position in which said inlets communicate with said outlet, so that the flow can be regulated independently of the hot and cold water controls. As said piston moves between either of said positions the flow of water varies depending on the amount of its movement. Said outlet acting in this case as a flow passage, can be connected with a spout provided with a valve for selectively diverting the flow of water between two outlets for tub and shower use.

2 Claims, 6 Drawing Figures

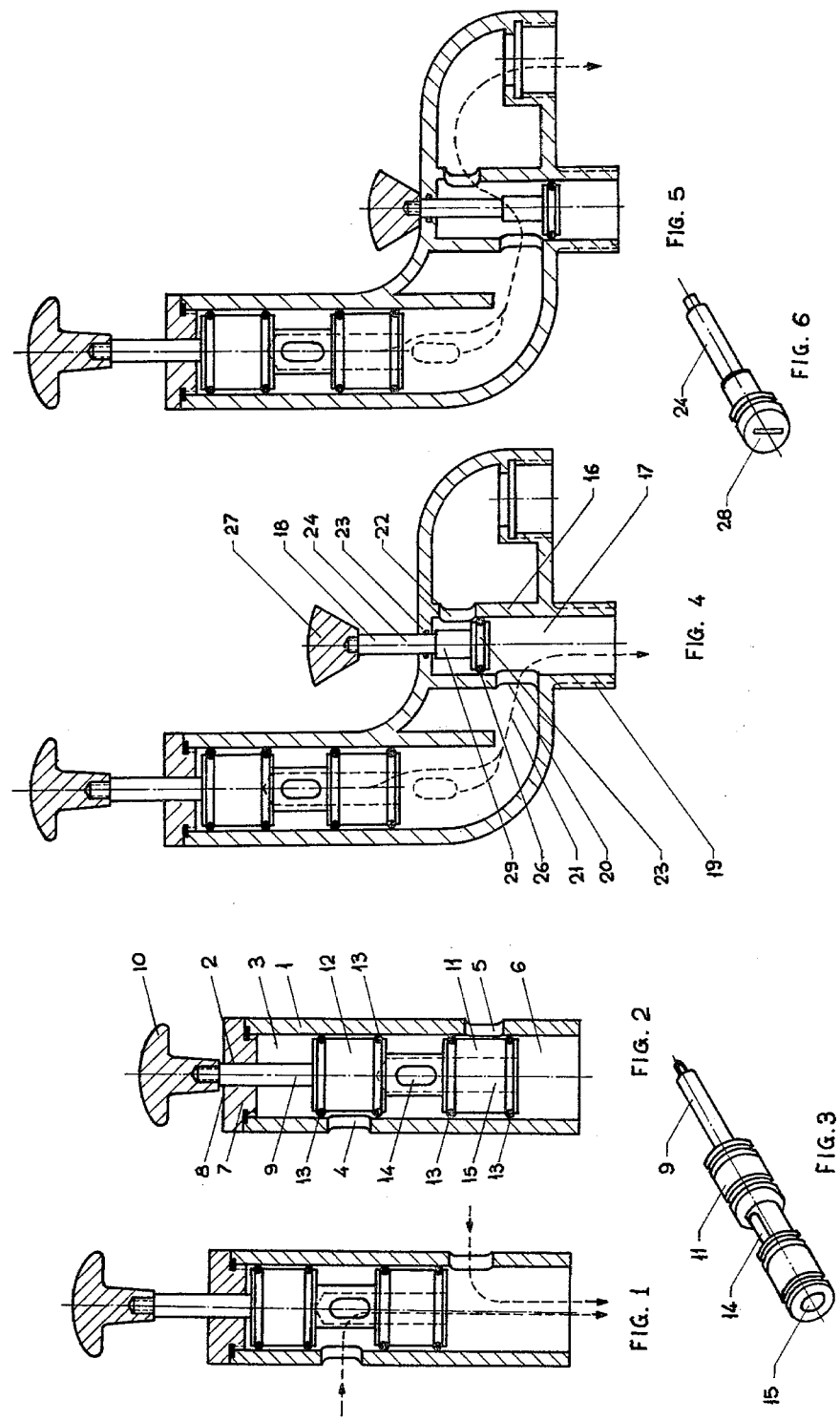

FAUCET CONTROL DEVICE

The invention relates to improvements in the conventional domestic water mixers, where separate hot and cold water control handles are provided for regulating the temperature and volume of water.

Conventional devices including means for temperature regulation are also known, but such devices are complex in design and structure and they quickly wear out and are very costly.

It is an object of the invention to provide a control device capable of controlling the outflow of water from a faucet at a given temperature, without re-adjusting the water temperature by operating the hot and cold water controls.

Another object of the invention is to vary the rate of flow, independently of the hot and cold water controls.

As a feature of the invention, therefore, the temperature of the water is adjusted only once and the water can be turned off or on as desired.

It is a further object of the invention to provide a device which can be economically manufactured and which utilizes long wearing o-ring seals as the primary shut-off elements of the valves, so that faucets embodying the valves require little maintenance.

Other objects and advantages of the invention will be apparent from the consideration of the following description and claims.

The invention can be adapted both to one-outlet mixers, for use in a kitchen sink or elsewhere, and to two-outlet mixers for use in a bathroom. In the last case a diverter valve is added to the device for selecting water between a shower and a tub spout.

BRIEF DESCRIPTION OF THE DRAWINGS

FIGS. 1 and 2 are sectional views showing the apparatus as used for an one outlet mixer in two different positions of operation.

FIG. 3 is a perspective view of the valve body as shown in FIGS. 1 and 2.

FIGS. 4 and 5 are side sectional views of the apparatus as shown in FIG. 1 (open position) in association with a spout provided with a diverter valve for tub and shower use, in two different positions of operation.

FIG. 6 is a perspective view of the diverter valve as shown in FIGS. 4 and 5.

DETAILED DESCRIPTION

FIGS. 1, 2 and 3 illustrate an one outlet mixer. Therein is seen a hollow sleeve I which slidably receives a piston assembly 2. The sleeve I has a cylindrical bore 3 in which the piston 2 is slidably received.

The sleeve I has two inlets 4 and 5 for the supply, respectively, of hot and cold water. These inlets, being axially at different levels, are respectively adapted for connection to hot and cold water conduits each having a separate control handle (not shown). Each of the inlets is in the form of an oblong slot which is elongated in the direction of the axis of the cylindrical sleeve I for a purpose which will become apparent later.

The sleeve I has an outlet 6 which for example can lead to a conduit which terminates in a spout for flow of water in a washtub, kitchen sink or elsewhere.

At the upper end of the sleeve I there is a cap nut 7 provided with a hole 8 which slidably receives a stem 9 of the piston 2. A handle 10 is detachably secured to the stem by means of a threaded connection at the upper end thereof. The handle facilitates movement of the piston between the positions shown in FIGS. 1 and 2.

The piston 2 carries a portion 11 which is sealably and slidably mounted on the cylindrical bore 3. A second portion 12 is axially spaced from portion 11 and is mounted on the stem 9 also for sealed slidable movement within the cylindrical bore 3. Portions 11 and 12 carry sealing rings 13 in respective grooves to provide the sealing engagement with the cylindrical bore 3.

The stem 9 of the piston has between the portions 11 and 12 an inlet port 14 communicating with the central flow passage 15 of the stem axially bored in it.

The piston 2 is axially displaceable in the sleeve between a first inserted position as shown in FIG. 2 and a second retracted position as shown in FIG. 1. In the first position each of the water inlets 4 and 5 is separately and completely blocked, so as to exclude any intercommunication between them, and no water will flow to the outlet 6. In the second position the hot and cold water inlets 4 and 5 are in communication with the outlet 6.

The rate of flow can be regulated by slightly moving the handle, and thereby the piston, in one direction or the other. For this reason, i.e in order to make the rate of flow substantially proportional to the displacement of the piston, the inlets 4 and 5 are in the shape of oblong slots as previously explained.

FIGS. 4, 5 and 6 illustrate the same apparatus as above but in association with a spout provided with a diverter valve for tub and shower use in two different positions of operation. The piston 2 is shown in FIGS. 4 and 5 in the second retracted (open) position.

The diverter valve consists of a hollow sleeve member embodied in the spout and a piston assembly. The sleeve 16 has a cylindrical bore 17 in which the piston 18 is slidably received. At the lower end of the sleeve 16 there is an externally threaded portion 19 adapted for being connected to a conduit, such as a shower pipe.

The sleeve 16 has an inlet 20 for the supply of water entering from flow passage 21, and a second outlet 22 for flow of water into a bath tub. Inlet 20 and outlet 22 are in the form of an oblong slot which is elongated in the direction of the axis of the cylindrical sleeve 17 to avoid wear of the piston's o-ring.

The upper end of the sleeve is provided with a hole 23 with an internal groove in it for an o-ring, which slidably and sealably receives the stem 24 of the piston 18.

The piston 18 carries a portion 25 which is sealably mounted in the cylindrical bore 17. This portion carries a sealing ring 26 in respective groove to provide the sealing engagement with the cylindrical bore 17.

A portion 29 of the stem, in contact with portion 25 of the piston, is of greater diameter than the rest of it, thus engaging the piston to stop at the right position in its upward movement as in FIG. 4. The lowered position of the piston as in FIG. 5 is communicated to the user by the full insertion of the piston and the engagement of handle 27 with the top of the sleeve.

A handle 27 is detachably secured to the stem of the piston by means of a threaded connection at the upper end thereof. The handle facilitates movement of the piston between the positions as shown in FIGS. 4 and 5.

A slot 28 is provided in the lower portion 25 to facilitate the engagement of the piston to allow the handle 27 to be threadably engaged on the upper end of the stem 24 after the piston has been inserted into the cylindrical bore of the sleeve.

By placing, therefore, the piston in the position shown in FIG. 4, outlet 22 is blocked and the water will flow to the shower. By placing it in the position shown in FIG. 5, outlet to the shower is blocked, and water will flow to the bath tub outlet.

While the invention has been described in conjunction with the specific embodiment thereof, it will become apparent to those skilled in the art that numerous modifications and variations can be made without departing from the scope of the invention as defined in the appended claims.

What is claimed is:

1. Apparatus comprising a hollow sleeve member having hot and cold water inlets for connection to hot and cold water supplies, and one outlet, and piston means slidably mounted in said sleeve for movement between a first position in which said inlets communicate with said outlet, and a second position in which said inlets are blocked, said sleeve having a cylindrical bore,
said inlets being axially located at different levels,
said inlets being provided with oblong holes,
said outlet being coaxial and coextensive with said bore,
said piston means in its movement between the first and the second position gradually opening or closing the inlets to increase or reduce the rate of flow through said inlets to said outlet,
said piston means comprising first and second axially spaced piston portions, confined for sealed slidable movement in said cylindrical bore,
said piston portions provided with O-ring seals,
said piston means comprising a stem on which said first and second piston portions are secured,
said stem being of smaller diameter than said first and second piston portions,
said stem having an inlet between said first and second piston portions and a central flow passage bored axially in said stem and communicating with said outlet.

2. Apparatus as claimed in claim 1 in association with a spout having a valve for selectively diverting the flow of water between two outlets, said valve comprising a hollow sleeve member having one inlet and first and second outlets and piston means slidably mounted in said sleeve for movement between a first position in which one of said outlets is blocked and the inlet communicates with the other outlet, and a second position in which said other outlet is blocked and the inlet communicates with said one outlet,
said sleeve having a cylindrical bore,
said first outlet being coaxial and coextensive with said bore,
said second outlet extending laterally in communication with said bore,
said first and second outlets being located on opposite sides of said inlet,
said inlet and second outlet being provided with oblong holes,
said piston means comprising a first piston portion confined for sealed slidable movement in said cylindrical bore,
said piston portion carrying a sealing ring in respective groove to provide the sealing engagement with said cylindrical bore,
said piston means comprising a stem on which said first piston portion is secured,
said stem being of smaller diameter than said piston portion, part of said stem, in contact with said first piston portion, being of greater diameter than therest of it, thus engaging the piston to stop at the right position in its upward movement, said piston means comprising a handle on said stem for displacement of said stem and the piston portion thereof.

* * * * *